June 18, 1963 A. SILVERMAN 3,093,854
MACHINE FOR AUTOMATICALLY FEEDING A PLUMBER'S SNAKE
Filed June 13, 1960 3 Sheets-Sheet 1
Fig. 1
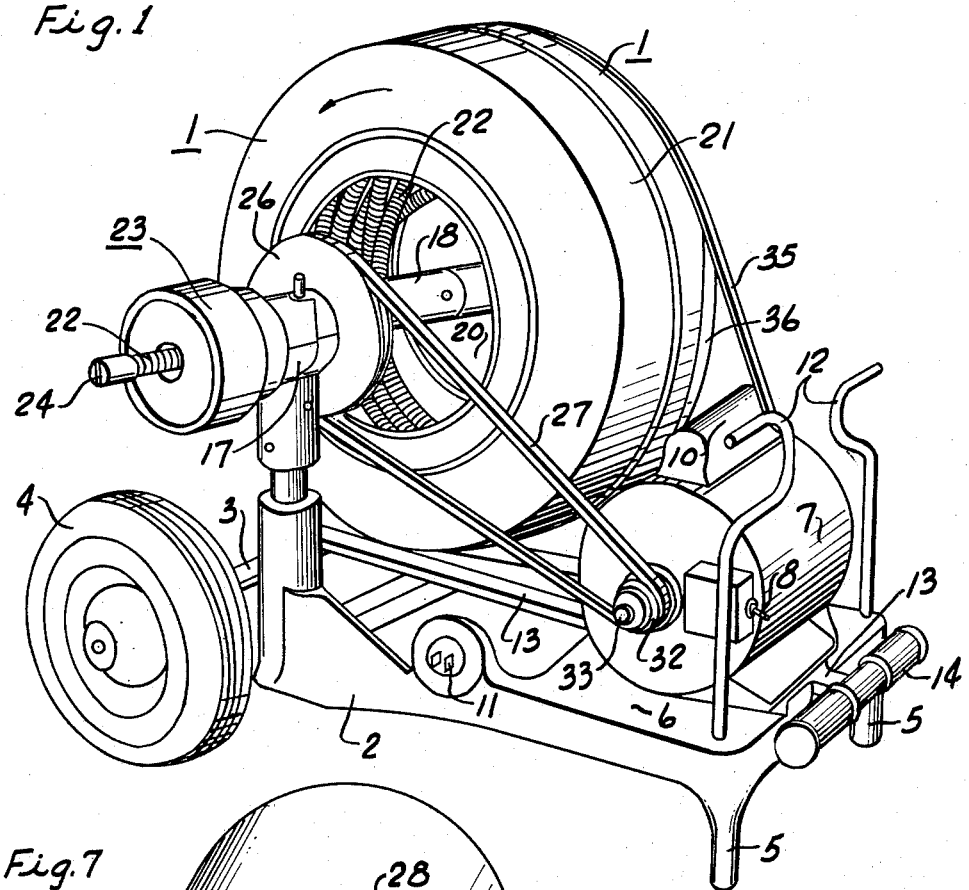
Fig. 7
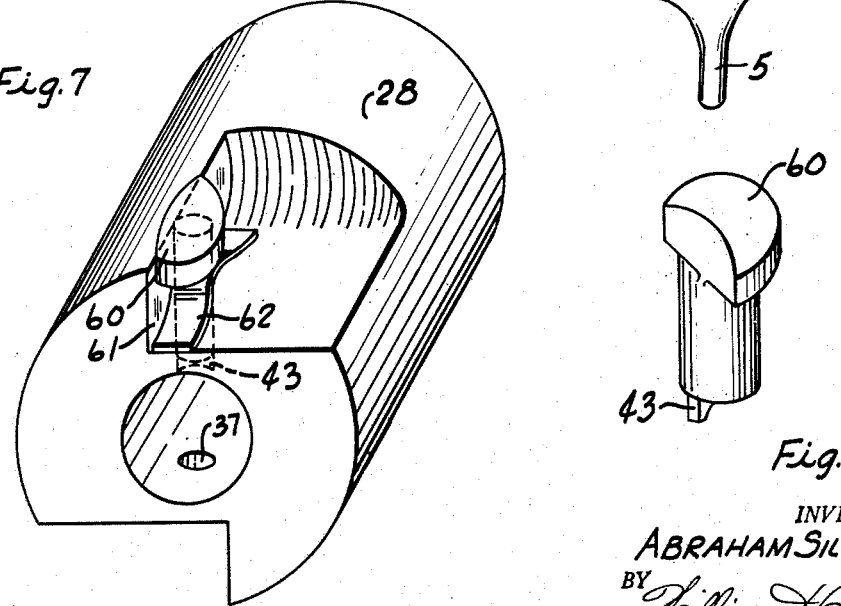
Fig. 8
INVENTOR.
ABRAHAM SILVERMAN
BY *William D. Carruthers*
HIS ATTORNEY June 18, 1963 A. SILVERMAN 3,093,854
MACHINE FOR AUTOMATICALLY FEEDING A PLUMBER'S SNAKE
Filed June 13, 1960 3 Sheets-Sheet 2

INVENTOR.
ABRAHAM SILVERMAN
BY
HIS ATTORNEY

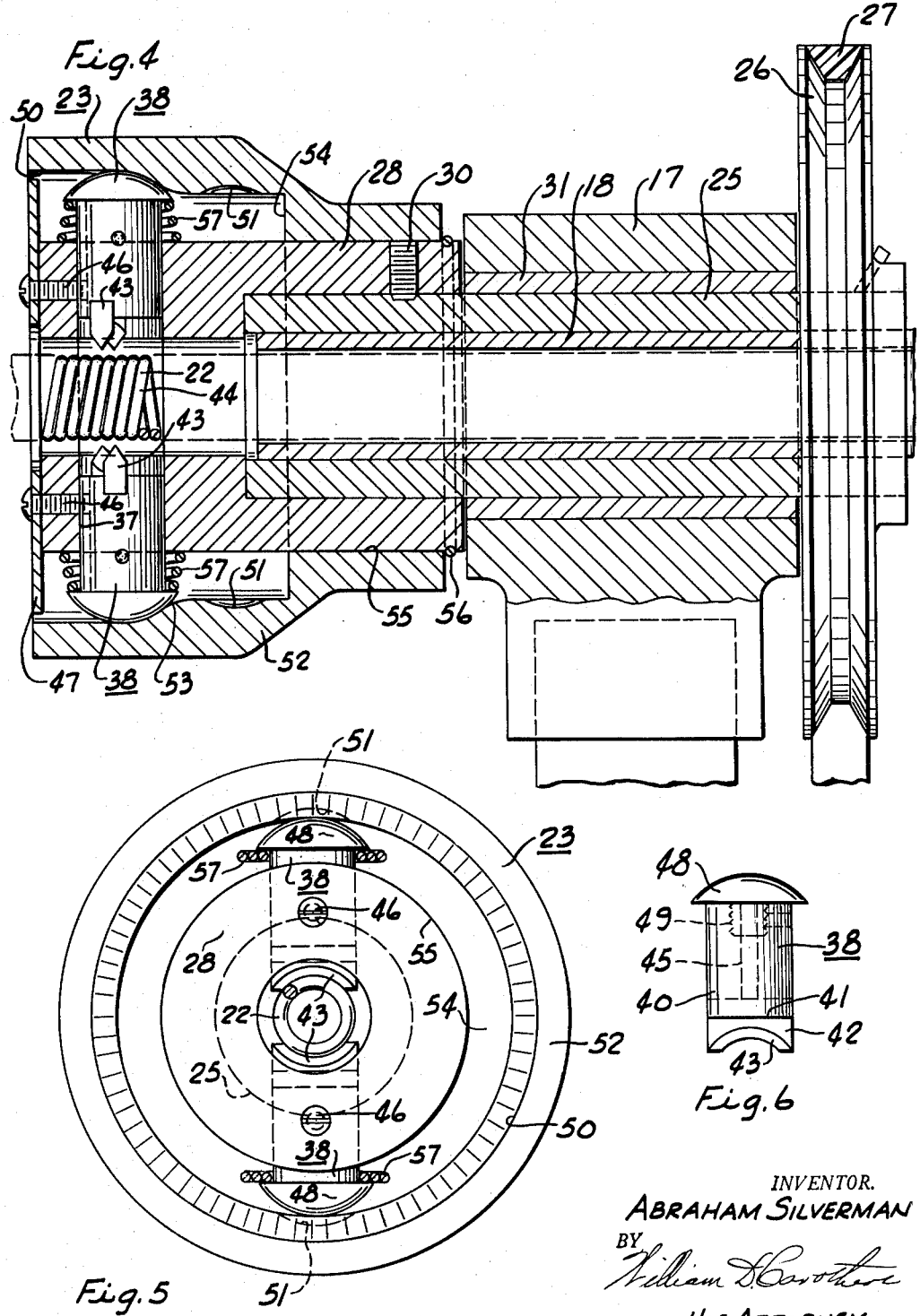

United States Patent Office 3,093,854
Patented June 18, 1963

3,093,854
MACHINE FOR AUTOMATICALLY FEEDING
A PLUMBER'S SNAKE
Abraham Silverman, % General Wire Spring Co., S. 9th
and Sarah Sts., Pittsburgh, Pa.
Filed June 13, 1960, Ser. No. 35,622
1 Claim. (Cl. 15—104.3)

This invention relates generally to sewer augering machines and more particularly to a sewer auger that provides power to feed the sewer auger or snake into the pipe.

The principal object of this invention is to provide a simple and effective clutch for engaging the helically wound sewer auger snake to feed the same into a pipe to be cleaned. The auger snake must be rotated at all times and in order to make the clutch effective in feeding the auger snake it is necessary to rotate the clutch at a different speed than that of operating or rotating the whole of the auger snake. This is accomplished by using a helical wound snake that has a lefthand armored helix and rotating the clutch member in the same direction as that of rotating the snake but at a faster rate of feed than that of rotating the snake. This requires the clutch when in engagement to turn relative to the snake and at a faster speed. The direction of the helix which is lefthand requires the snake and the clutch to be driven in a counterclockwise direction.

Another object of this invention is the provision of a clutch which is in the form of diagonally opposed slides having sharp tooth portions which conform to the space between adjacent turns of the helical wound armor on the flexible augering snake. These tooth forms thus are disposed at an angular relation relative to a transverse normal plane so as to fit the pitch of the helix.

Another object is the provision of a clutch which although rotating presents a bell-shaped portion that can readily be grasped and moved in or out and thereby actuate the clutch. By changing the length of the slides one may employ different sized helical wound auger snakes without changing the other structure making up the machine.

Another object is the provision of a portable base provided with a pair of wheels and a stand together with an extensible handle for raising the base off the stationary support and shifting it to the wheels alone so that it may be guided and moved from place to place.

Another object is the manner in which the clutch slides are constructed to make them nonrotary relative to the clutch body.

Other objects and advantages appear hereinafter in the following description and claim.

The accompanying drawings show for the purpose of exemplification without limiting this invention or the claim thereto, certain practical embodiments illustrating the principles of this invention wherein:

FIG. 1 is a perspective view of the side of the sewer augering machine.

FIG. 4 is a sectional view of the clutch and its mounting.

FIG. 5 is an end view of the clutch as shown in FIG. 4.

FIG. 6 is a detailed view of the slide employed in FIGS. 4 and 5.

FIG. 7 is an enlarged perspective view of a modified form of slide.

FIG. 8 is a detailed view of a modified form of slide.

Figure 2:
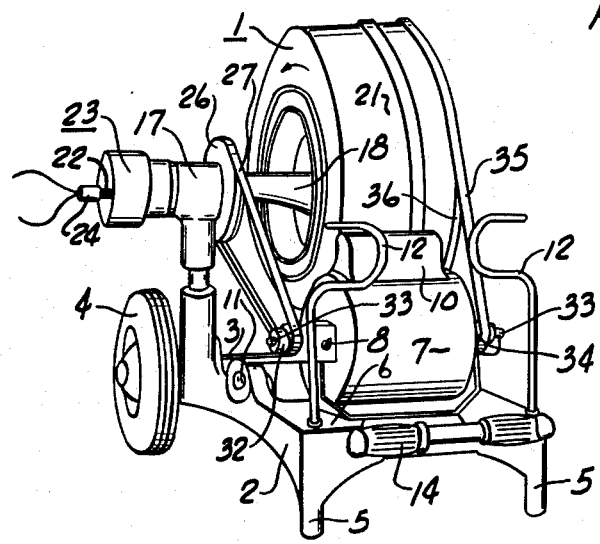
FIG. 2 is a perspective view of one end of the sewer augering machine.
Figure 3:
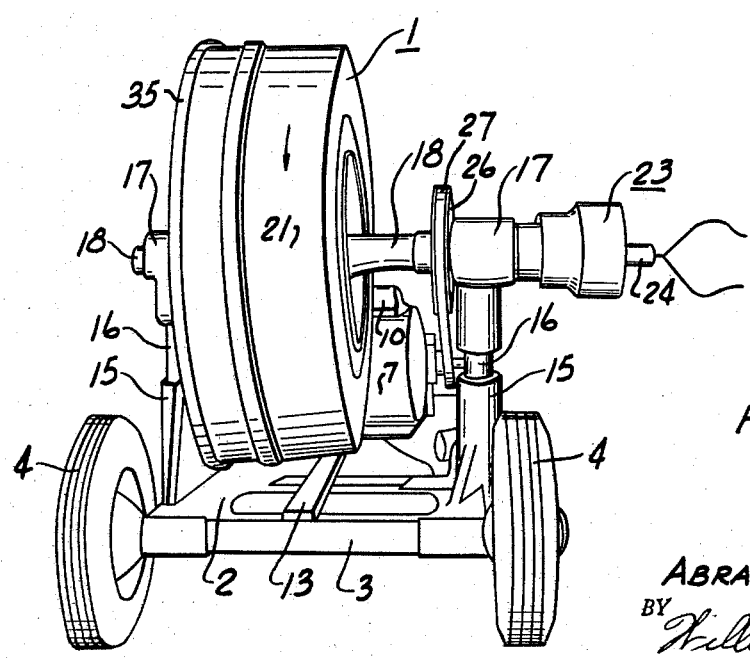
FIG. 3 is a perspective view of the opposite end of the sewer augering machine.

Referring to FIGS. 1 to 3 of the drawings the sewer augering machine 1 is mounted on a base 2 which is rectangular in shape and is provided at one end with the axle 3 to support the wheels 4. The opposite end of the base 2 is provided with depending legs 5. A platform 6 of the base carries a motor 7 which is preferably an alternating current motor which is capable of being reversed as by the switch 8. This is also a capacitor motor. The capacitor 10 is shown at the top of the motor 7 and the pronged input electrical connection is indicated at 11. An extension cord may be wound around the pair of hooks 12 for connecting the plug 11 to a suitable outlet near to the place where the snake is to be used.

Under the platform 6 is a slot to receive the tongue extension 13 of the handle 14. The extension 13 may be drawn outwardly until it embraces a stop under the platform 6 and the handle thus extended will be locked in place and enable one to wheel or maneuver the sewer augering machine on the two wheels 4 like a wheelbarrow or two-wheeled cart.

The base 2 has a pair of upstanding socket members 15 at opposite sides thereof to receive the standard members 16 that may be adjustable vertically in the sockets 15 for the purpose of tightening the V-belt drives of the motor and for employing drums of different sizes on the base. Each standard 16 has a cap bearing 17 to receive the rotary shaft 18, the rotary shaft 18 is secured to the closed end 20 of the drum 21. The shaft 18 is hollow and where it extends into the drum 21 and is secured to the closed end 20 of the drum it has an opening in which to receive the sewer auger snake 22. The snake enters the hollow shaft 18 and extends through the chuck or clutch member 23 and has a socket 24 to receive the different heads for the purpose of performing different operations in cutting different obstructions in the sewer.

As shown in FIG. 4 the shaft 18 which is journaled in the bearing 17 is rotatably mounted in the sleeve 25 which has secured to one of its ends the small pulley 26 that carries the V-belt 27 and at its other end the clutch body 28 which is secured thereto as by the set screws 30. The sleeve 25 in turn is journaled in the bearing liner 31 that is, has a press fit in the bearing housing member 17. Thus the rotation of the small V-belt pulley 26 will rotate the sleeve 25 relative to the shaft 18. The V-belt 27 is connected to a small V-belt pulley 32 on the motor shaft 33 of the motor 7. The opposite end of the motor shaft 33 is provided with a V-belt pulley 34 for driving the V-belt 35 and encircles a groove 36 in the drum 21. The drum 21 being materially larger in diameter than the V-belt pulley 26 and causes the latter to rotate at a faster rate of speed than that of the drum and thus a differential in speed is provided at the clutch 23, the clutch rotating at a faster rate than that of the shaft 18.

The clutch body 28 is provided with opposed circular openings 37 for receiving the slides 38. As shown in FIG. 6 the slide has a circular stem portion 40 which terminates with a flat bottom 41 and is slotted to receive the tooth member 42 which is secured in place as by bracing or welding and has a single sharpened tooth member 43 which is arcuate as shown in FIGS. 5 and 6 to penetrate between the adjacent turns of the helical wound armor on the snake. These tooth-like portions are clearly shown in FIG. 4 to be sharpened and they are disposed so that when they are forced into engagement with the helix 44 of the armor covering the snake 22 they will engage the same and when they rotate faster than the snake in a counterclockwise direction they actually function as a nut in forcing the snake 22 outwardly and into the pipe being augered.

The rounded portion of the slide 38 is provided with a slot 45 which receives the end of the screw 46 that passes through the outer end of the body 28 and holds the closer plate 47 in position. Thus the screw 46 functions to prevent the slides from rotating in their circular sockets 37. This maintains the teeth 43 at their proper positions at all times for engaging the helical armor 44 of the snake 22.

Each slide is provided with an arcuate head 48 which engages the bores 50 and 51 of the bell 52 of the clutch 23. These bores 50 and 51 are connected by the reverse curve 53 which enables one to move the bell outwardly and back relative to the body 28. The bell is freely rotatable on the body 28. The bore 51 terminates at the wall 54, and the balance of the bell is bored as indicated at 55 to have a sliding bearing on the circular body 28, it being prevented from traveling inwardly towards the bearing by the snap ring 56 carried on the body 28 and the wall 54 engages heads 48 of the slides to prevent the bell from coming off of the body 28. Thus when the bell is forced outwardly the heads 48 ride up with the cam surface 53 connecting the bores 50 and 51 and thus force the slides inwardly so that their teeth 43 engage between adjacent turns of the helical armor 44 on the snake 22. Each slide is provided with a spiral spring 57 which when compressed will be no thicker than one thickness of the spring wire. Thus it is a true spiral and saves room providing some clearance limitations of the entry of the teeth 43 between the helical wound armor 44 on the snake 22.

Thus one may grasp the bell 52 of the clutch 23 and hold it while the machine is operating and if it is desired to extend the slides inwardly to engage the snake the bell is moved to the left in FIG. 4 causing the heads 48 to ride up the cam surface 53 and engage the bore 51 thereby causing the snake to feed outwardly to the left. Upon reversing the motor one may feed the snake back into the drum 21. It it is desired to uncouple the clutch one need only to draw the bell 52 rearwardly toward the bearing 17 so that the heads 48 of the slides move down the cam surface 53 and their springs 57 will expand them so that they do not engage the snake 22.

As shown in FIG. 7 the body 28 of the clutch member is provided with the bore 37 to receive the slides which in this instance have a cylindrical stem section 40 to fit the bore and a flattened head section 60 to fit the face 61 for the purpose of preventing the slide from rotating so as to maintain the tooth 43 in its proper position. This structure eliminates the slots 45 in the cylindrical section 40 of the slide.

It is preferable to have the slides at different lengths for use in employing this clutch with snakes of different diameter. However, as shown in FIG. 6 the circular head 48 may be the head of a screw, the thread stem of which is indicated at 49 for the purpose of entering a complementary threaded axial opening in the cylindrical stem 40 of the slide 38. This head may be unscrewed to force the slide in further. However, it is necessary to use a set screw for the purpose of locking the screw 49 and the head 48 in position. Since it is necessary to open the clutch to make this adjustment it will be found to be just as simple to change the length of the slides rather than to make this adjustment.

I claim:

A power fed sewer auger consisting of a rotary storage drum for containing a coiled sewer auger snake to be power rotated and power fed along the rotary axis of said drum to the pipe to be cleaned, a helix on the exterior of said snake forming continuous helical grooves, a motor connected to rotate said drum in opposite directions to power rotate said snake, a hollow clutch rotatably mounted coaxially of said drum to feed said snake to and from said drum, said clutch having a rotary tubular body with a bore to pass said snake, transverse slide means supported by said body for radial movement into and out of the bore of said body, means carried by said body to bias the movement of said slide means outwardly, tooth means on the inner end of said slide means to mate with the helical grooves formed on the exterior of said snake when said slide means is moved inwardly, drive means from said motor to rotate said clutch at a different speed from that of the speed of rotation of said drum, a cylindrical bell having large and small bores and mounted to slide back and forth between limits on said tubular body, said large and small bores alternately covering the outer ends of said slide means to limit their biased radial outward movement in said body, said small bore in said bell moving said slide means inwardly to engage said tooth means with the helical grooves on said snake to power feed the same, said large bore in said bell permitting said biased tooth means to completely disengage from said snake, said bell being manually slidable on said body to selectively engage said slide means in said large bore and in said small bore to merely power rotate said snake without feeding movement and to power rotate while power feeding said snake in accordance to the direction of the rotation of said motor and without interrupting the continuous operation of said motor, and means to retain the selected bore position of said manually shifted bell while the rotation of said clutch subsists.

References Cited in the file of this patent
UNITED STATES PATENTS

| | | |
|---|---|---|
| 950,431 | Bradford | Feb. 22, 1910 |
| 1,120,530 | Pieper | Dec. 8, 1914 |
| 2,393,764 | Frank | Jan. 29, 1946 |
| 2,396,006 | Hall | Mar. 5, 1946 |
| 2,400,183 | Wilson | May 14, 1946 |
| 2,562,574 | Poekert | July 31, 1951 |
| 2,730,740 | O'Brien | Jan. 17, 1956 |
| 2,955,307 | Hunt | Oct. 11, 1960 |

FOREIGN PATENTS

| | | |
|---|---|---|
| 378,879 | Great Britain | Aug. 8, 1932 |